United States Patent
Takahashi et al.

(10) Patent No.: US 10,421,329 B2
(45) Date of Patent: Sep. 24, 2019

(54) SLIDE BEARING

(71) Applicant: OILES CORPORATION, Tokyo (JP)

(72) Inventors: Kohei Takahashi, Fujisawa (JP);
Kouichi Morishige, Fujisawa (JP);
Keisuke Imagawa, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/069,983

(22) PCT Filed: Jan. 10, 2017

(86) PCT No.: PCT/JP2017/000524
§ 371 (c)(1),
(2) Date: Jul. 13, 2018

(87) PCT Pub. No.: WO2017/122646
PCT Pub. Date: Jul. 20, 2017

(65) Prior Publication Data
US 2018/0370317 A1    Dec. 27, 2018

(30) Foreign Application Priority Data
Jan. 15, 2016 (JP) .................................. 2016-006671

(51) Int. Cl.
*F16C 17/04* (2006.01)
*B60G 15/06* (2006.01)
(Continued)

(52) U.S. Cl.
CPC ............. *B60G 15/068* (2013.01); *B60G 7/02* (2013.01); *B60G 15/06* (2013.01); *F16C 17/04* (2013.01);
(Continued)

(58) Field of Classification Search
CPC ........ B60G 15/068; F16C 17/04; F16C 27/02; F16C 27/08; F16C 33/20; F16C 33/74;
(Continued)

(56) References Cited

U.S. PATENT DOCUMENTS 7,273,317 B2 * 9/2007 Miyata ................. B60G 15/068
384/420
2006/0215944 A1   9/2006 Watai et al.
(Continued)

FOREIGN PATENT DOCUMENTS

| | | |
|---|---|---|
| CN | 1748090 | 3/2006 |
| CN | 101438069 | 5/2009 |

(Continued)

OTHER PUBLICATIONS

International Search Report for PCT/JP2017/000524 w/ English Translation, dated Mar. 28, 2017, 5 pages.
(Continued)

*Primary Examiner* — Phillip A Johnson
(74) *Attorney, Agent, or Firm* — Nixon & Vanderhye P.C.

(57) ABSTRACT

A slide bearing (1) is provided with an upper case (2) attached to an upper support for attaching a strut assembly to a vehicle body, a lower case (3) which is rotatably combined with the upper case (2) and which forms an annular space (7), and an annular center plate (4) and sliding sheet (5) disposed in the annular space (7). The upper case (2) has a load-transmitting surface (27) constituting part of an upper surface of the annular space (7), the center plate (4) is provided with an annular recess (43) filled with a lubricant, and the center plate (4) has a bearing surface (41) for supporting loads exerted on the load-transmitting surface (27). The sliding sheet (5), which is disposed between the load-transmitting surface (27) and the bearing surface (41), has a sliding surface (51) that slides against the bearing (Continued)

surface (41). The sliding sheet (5) is formed of a thermoplastic plastic, and the center plate (4) is formed from a thermoplastic elastomer having a lower modulus of elasticity than the thermoplastic plastic.

16 Claims, 10 Drawing Sheets

(51) Int. Cl.
*B60G 7/02* (2006.01)
*F16F 9/54* (2006.01)
*F16C 27/08* (2006.01)
*F16C 33/20* (2006.01)
*F16C 33/10* (2006.01)

(52) U.S. Cl.
CPC ............ *F16C 27/08* (2013.01); *F16C 33/103* (2013.01); *F16C 33/20* (2013.01); *F16F 9/54* (2013.01); *B60G 2202/312* (2013.01); *B60G 2204/418* (2013.01); *B60G 2204/45021* (2013.01); *F16C 2208/60* (2013.01)

(58) Field of Classification Search
CPC ... F16C 33/102; F16C 33/103; F16C 2326/05
See application file for complete search history.

(56) References Cited

U.S. PATENT DOCUMENTS

| | | | |
|---|---|---|---|
| 2007/0237439 A1 | 10/2007 | Watai et al. | |
| 2008/0310780 A1* | 12/2008 | Watai | B60G 15/068 384/420 |
| 2009/0180719 A1 | 7/2009 | Miyata et al. | |

FOREIGN PATENT DOCUMENTS

| | | | |
|---|---|---|---|
| CN | 101449068 | 12/2010 | |
| JP | 61-194819 | 12/1986 | |
| JP | 8-283552 | 10/1996 | |
| JP | 2000-179550 | 6/2000 | |
| JP | 2004-176728 | 6/2004 | |
| JP | 2004-239379 | 8/2004 | |
| JP | 2007-303613 | 11/2007 | |
| JP | 4380169 B2 * | 12/2009 | .............. F16C 17/04 |
| JP | 2012-97904 | 5/2012 | |
| JP | 2014-40869 | 3/2014 | |
| WO | WO 2013/042715 | 3/2013 | |

OTHER PUBLICATIONS

Search Report issued in CN Appln. No. 201780005902.6 dated May 29, 2019 (w/ translation).

\* cited by examiner

SLIDE BEARING

This application is the U.S. national phase of International Application No. PCT/JP2017/000524 filed Jan. 10, 2017 which designated the U.S. and claims priority to JP Patent Application No. 2016-006671 filed Jan. 15, 2016, the entire contents of each of which are hereby incorporated by reference.

TECHNICAL FIELD

The present invention relates to a slide bearing which supports a load applied to a shaft member while allowing rotation of the shaft member, and in particular relates to a slide bearing which supports a load applied to a strut-type suspension (McPherson strut) while allowing rotation of a strut assembly of the strut-type suspension.

BACKGROUND ART

A strut-type suspension used for a front wheel of an automobile has structure in which a strut assembly comprising a piston rod and a hydraulic shock absorber is combined with a coil spring. When a steering is operated, the strut assembly is rotated together with the coil spring. Accordingly, to support a load applied to the strut-type suspension while allowing smooth rotation of the strut assembly, usually a bearing is placed between an upper mount which is a mounting mechanism for mounting the strut assembly onto the automobile body, and an upper spring seat which is a spring seat for the upper end of the coil spring.

For example, the Patent Literature 1 discloses a slide bearing for a strut-type suspension. This slide bearing comprises: an upper case which is mounted on the side of an upper mount; a lower case which is mounted on the side of an upper spring seat and is rotatably combined with the upper case; and an annular center plate and an annular sliding sheet which are placed in an annular space formed by combining the upper case and the lower case.

Here, the upper case has an annular load transmission surface which forms an upper surface of the annular space formed by combination of the upper case and the lower case. The center plate is formed of plastic (synthetic resin) including at least one of polyamide resin, polyolefin resin, and fluorine resin, and has an annular bearing surface which supports a load transmitted from the load transmission surface of the upper case via the sliding sheet. This bearing surface has an annular recessed portion formed in a circumferential direction, and the recessed portion is filled with lubricating grease. The sliding sheet is formed of plastic including at least one of polyamide resin, polyester resin, polyolefin resin, polycarbonate resin, and fluorine resin. The sliding sheet is placed between the load transmission surface of the upper case and the bearing surface of the center plate, and has a sliding surface that comes in slidable contact with the bearing surface of the center plate.

The slide bearing of the above structure supports a load applied to the strut-type suspension by the bearing surface of the center plate via the load transmission surface of the upper case and via the sliding sheet. Further, the lubricating grease filled in the recessed portion of the bearing surface of the center plate lubricates the bearing surface of the center plate and the sliding surface of the sliding sheet pressed against the bearing surface by the load applied to the strut-type suspension, to allow thereby smooth rotation of the strut-assembly.

CITATION LIST

Patent Literature

Patent Literature 1: Japanese Unexamined Patent Application Laid-Open No. 2004-176728

SUMMARY OF INVENTION

Technical Problem

Load applied to a strut-type suspension changes in direction depending on vehicle's running conditions and the like. In the slide bearing described in the Patent Literature 1, sometimes the sliding surface of the sliding sheet and the bearing surface of the center plate come in uneven contact with each other because of an unbalanced load applied to the sliding sheet and the center plate owing to direction change of the load applied to a strut-type suspension. In that case, a gap is generated between the sliding surface of the sliding sheet and the bearing surface of the center plate, and the lubricating grease lubricating the bearing surface and the sliding surface is pushed out through the gap. When this is repeated in many years of use, the lubricating grease filled in the recessed portion of the bearing surface of the center plate decreases, and it becomes impossible to lubricate sufficiently the sliding surface of the sliding sheet and the bearing surface of the center plate. As a result, torque required for rotating the upper case and the lower case relative to each other increases from the initial state. Thereby, the feeling of steering operation is changed from the initial state.

The present invention has been made taking the above conditions into consideration, and an object of the present invention is to provide a slide bearing which can support load applied to a shaft member while allowing smooth rotation of the shaft member over a long period.

Solution to Problem

To solve the above problems, in the slide bearing of the present invention, one of an annular center plate and an annular sliding sheet which are placed in an annular space formed by combining an upper case and a lower case, is formed of thermoplastic elastomer having a lower elastic modulus (lower rigidity) than the material of the other. Further, at least one of a surface of the center plate and a surface of the sliding sheet which are in sliding contact with each other, is provided with a recessed portion to be filled with lubricant.

For example, the present invention provides a slide bearing for supporting a load applied to a shaft member while allowing rotation of the shaft member, comprising:

an upper case which is attached to an object to be supported by the shaft member in a state that the shaft member is inserted in the upper case;

a lower case which is rotatably combined with the upper case in a state that the shaft member is inserted in the lower case, so that an annular space is formed between the upper case and the lower case; and an annular center plate and an annular sliding sheet which are placed in the annular space;

wherein, the sliding sheet is placed at least either between the upper case and the center plate or between the center plate and the lower case;

at least one of a surface of the center plate and a surface of the sliding sheet which are in sliding contact with each other, has a recessed portion to be filled with a lubricant; and one of the center plate and the sliding sheet is formed of elastically-deformable material having a lower elastic modulus than the other.

Advantageous Effects of Invention

According to the present invention, the center plate or the sliding sheet which is formed of elastically deformable material, becomes elastically deformed, and the surface of the center plate and the surface of the sliding sheet come in close contact with each other. Thereby, the sealing performance of the lubricant filled in the recessed portion formed in at least one of these surfaces is improved. Accordingly, even if an unbalanced load is applied to the sliding sheet and the center plate, the lubricant lubricating the surface of the center plate and the surface of the sliding sheet which are in sliding contact with each other, can be prevented from being pushed out through a gap between these surfaces. Accordingly, the lubricant can lubricate the surface of the center plate and the surface of the sliding sheet which are in sliding contact with each other, over a long period, and thus a load applied to the shaft member can be supported over a long period while allowing smooth rotation of the shaft member.

DESCRIPTION OF EMBODIMENTS

In the following, one embodiment of the present invention will be described.

Figure 1:
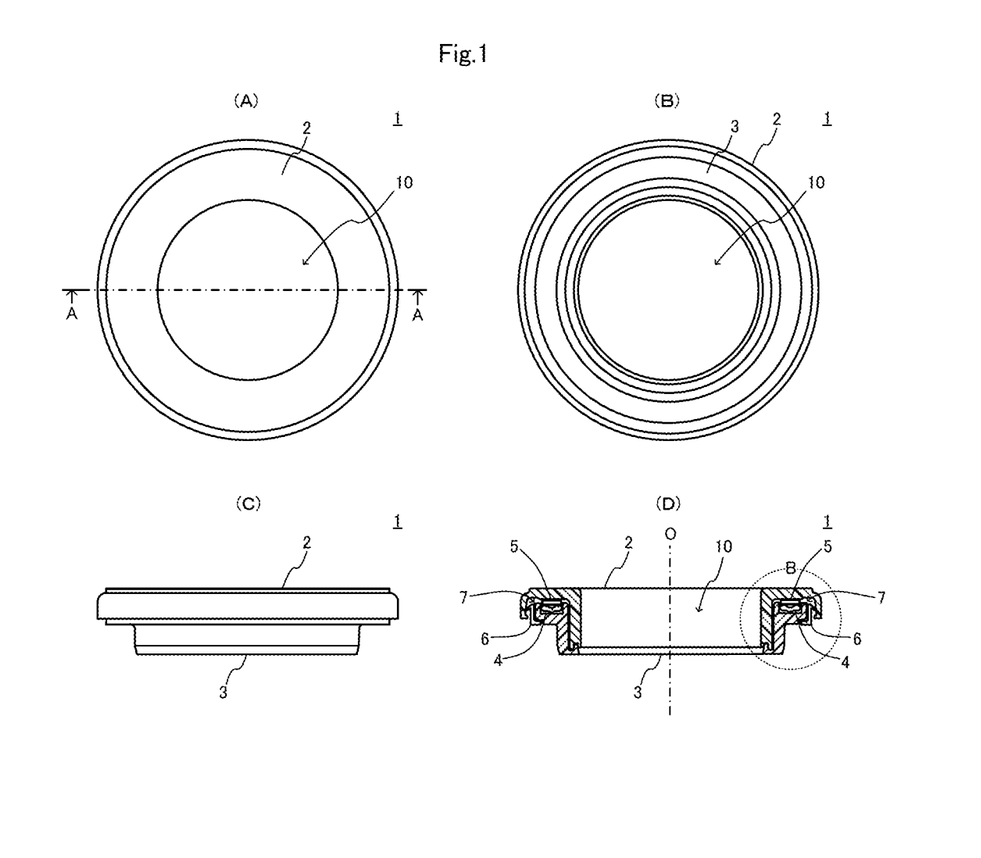
FIGS. 1(A), 1(B), and 1(C) are respectively a plan view, a bottom view, and a front view of a slide bearing 1 according to one embodiment of the present invention.
FIG. 1(D) is an A-A cross-section view of the slide bearing 1 shown in FIG. 1(A)
Figure 2:
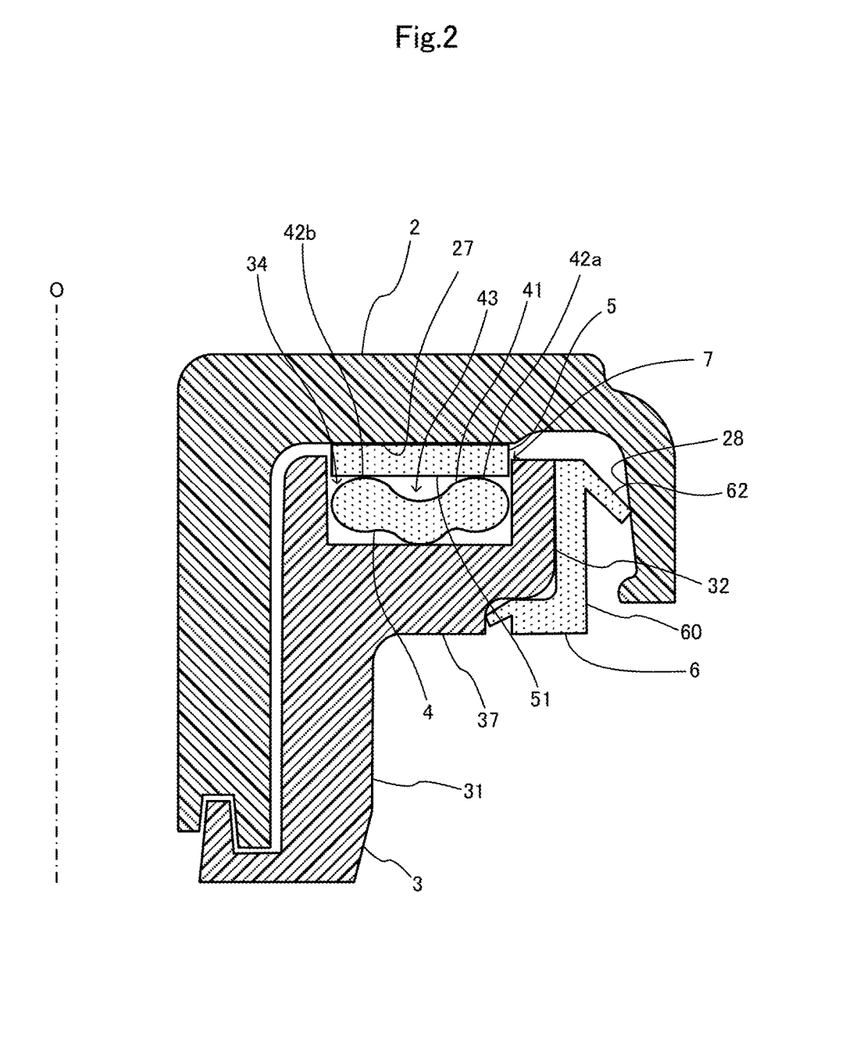
FIG. 2 is an enlarged view of the part B of the slide bearing 1 shown in FIG. 1(D)

FIGS. 1(A), 1(B), and 1(C) are respectively a plan view, a bottom view, and a front view of a slide bearing 1 according to one embodiment of the present invention, and FIG. 1(D) is an A-A cross-section view of the slide bearing 1 shown in FIG. 1(A). Further, FIG. 2 is an enlarged view of the part B of the slide bearing 1 shown in FIG. 1(D).

The slide bearing 1 of the present embodiment has a receiving hole 10 for receiving a strut assembly (not shown) of a strut-type suspension, and supports a load of a vehicle body applied to the strut-type suspension while allowing rotation of the strut assembly received in the receiving hole 10. As shown in the figures, the slide bearing 1 comprises: an upper case 2; a lower case 3 which is rotatably combined with the upper case 2 and forms an annular space 7 between the lower case 3 and the upper case 2; an annular center plate 4 and an annular sliding sheet 5 which are placed in the annular space 7; a dust seal 6 for preventing intrusion of dust into the annular space 7; and, although not shown, lubricant such as lubricating grease held in the center plate 4.

The upper case 2 is formed of thermoplastic having superior sliding characteristics such as polyacetal resin impregnated with lubricating oil as needed. In a state that the strut assembly of the strut-type suspension is inserted in the upper case 2, the upper case 2 is attached to an upper mount (not shown) as a mounting mechanism for mounting the strut assembly on the vehicle body.

Figure 3:
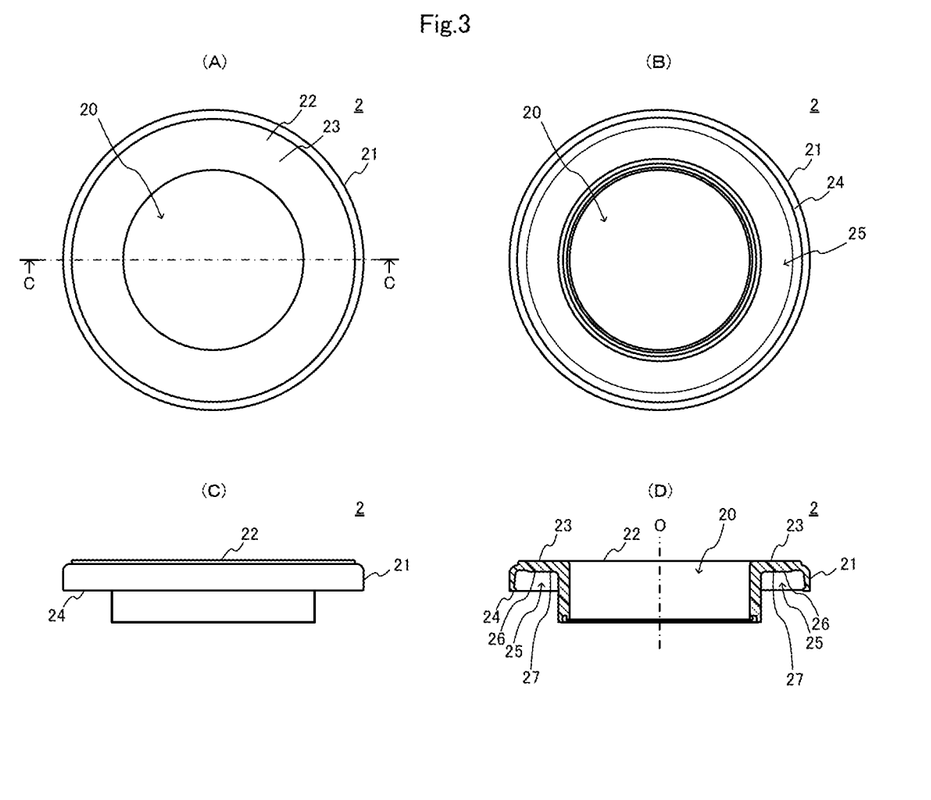
FIGS. 3(A), 3(B), and 3(C) are respectively a plan view, a bottom view, and a front view of an upper case 2.
FIG. 3(D) is a C-C cross-section view of the upper case 2 shown in FIG. 3(A)

FIGS. 3(A), 3(B), and 3(C) are respectively a plan view, a bottom view, and a front view of the upper case 2, and FIG. 3(D) is a C-C cross-section view of the upper case 2 shown in FIG. 3(A).

As shown in the figures, the upper case 2 comprises: an annular upper case body 21 having an insertion hole 20 for inserting the strut assembly; a attaching surface 23 which is formed in an upper surface 22 of the upper case body 21 for attaching the slide bearing 1 to the upper mount; and an annular recessed portion 25 which is formed in a lower surface 24 of the upper case body 21 and rotatably combined with the lower case 3 to form the annular space 7.

In a bottom surface 26 of the annular recessed portion 25, a load transmission surface 27 is formed to become an upper surface of the annular space 7. The load transmission surface 27 transmits a load of the vehicle body applied to the strut-type suspension to the sliding sheet 5 and the center plate 4.

The lower case 3 is formed of thermoplastic such as polyamide resin and is attached to an upper spring seat (not shown) which is a spring seat for the upper end of a coil spring (not shown) of the strut-type suspension, in a state that the strut assembly of the strut-type suspension is inserted in the lower case 3.

Figure 4:
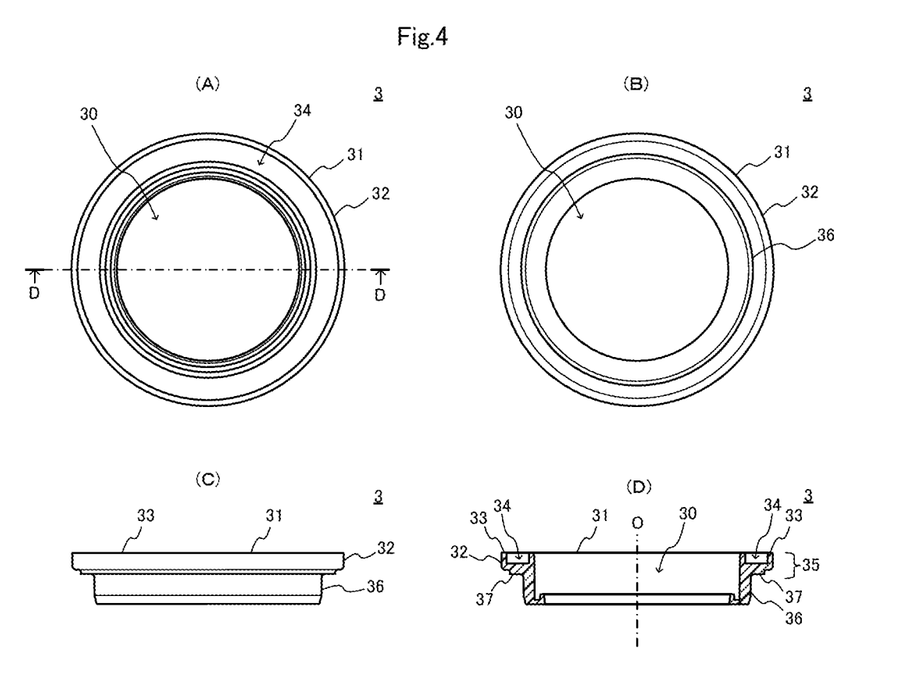
FIGS. 4(A), 4(B), and 4(C) are respectively a plan view, a bottom view, and a front view of a lower case 3.
FIG. 4(D) is a D-D cross-section view of the lowercase 3 shown in FIG. 4(A)

FIGS. 4(A), 4(B), and 4(C) are respectively a plan view, a bottom view, and a front view of the lower case 3, and FIG. 4(D) is a D-D cross-section view of the lower case 3 shown in FIG. 4(A).

As shown in the figures, the lower case 3 comprises: a tubular lower case body 31 having an insertion hole 30 for inserting the strut assembly; a flange portion 32 which is formed on the side of an upper end portion 35 of the lower case body 31 and extends radially outward from an outer peripheral surface 36 of the lower case body 31; and an annular recessed portion 34 which is formed in an upper surface 33 of the flange portion 32. When the lower case 3 is rotatably combined with the upper case 2, the annular recessed portion 34 is received in the annular recessed portion 25 formed in the lower surface 24 of the upper case body 21 of the upper case 2. Thereby, the annular space 7 is formed. The upper spring seat is attached to a lower surface 37 of the flange portion 32.

The center plate 4 is formed of thermoplastic elastomer such as polyester elastomer which is superior in sliding characteristics and has a lower elastic modulus than that of the below-mentioned thermoplastic used for the sliding sheet 5. The center plate 4 is added with lubricant such as PTFE, lubricating oil, or silicone as needed. Further, the center plate 4 is placed in the annular recessed portion 34 formed in the upper surface 33 of the flange portion 32 of the lower case 3, and supports the vehicle body's load applied to the strut-type suspension via the load transmission surface 27 of the annular recessed portion 25 of the upper case 2 which forms the annular space 7 together with the annular recessed portion 34, and via the sliding sheet 5 (See FIG. 2).

Figure 5:
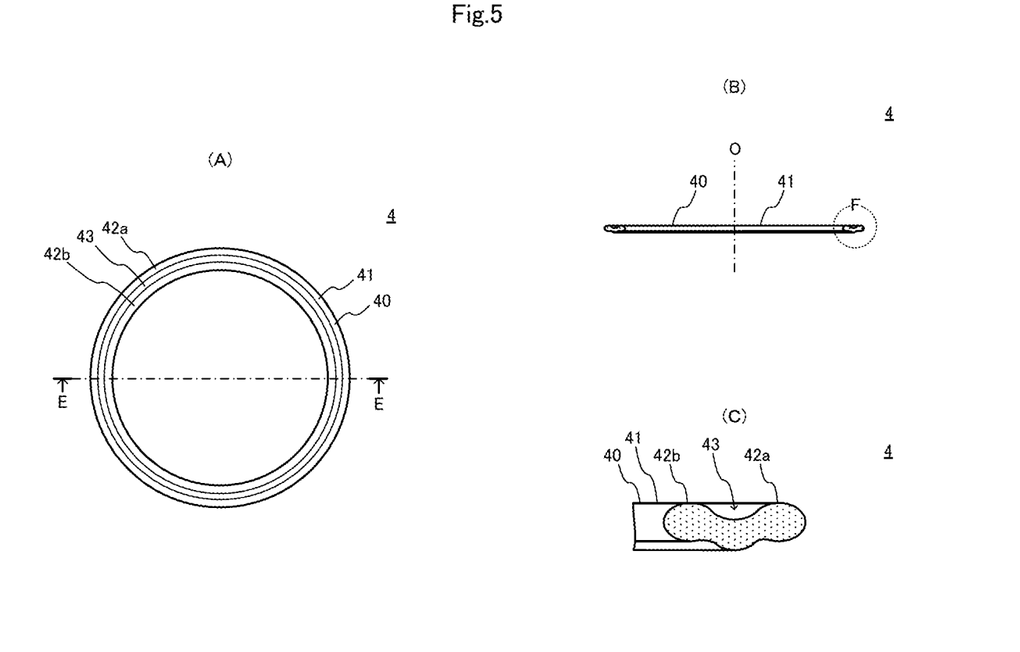
FIG. 5(A) is a plan view of a center plate 4.
FIG. 5(B) is an E-E cross-section view of the center plate 4 shown in FIG. 5(A)
FIG. 5(C) is an enlarged view of the part F of the center plate 4 shown in FIG. 5(B)

FIG. 5(A) is a plan view of the center plate 4, FIG. 5(B) is an E-E cross-section view of the center plate 4 shown in FIG. 5(A), and FIG. 5(C) is an enlarged view of the part F of the center plate 4 shown in FIG. 5(B).

As shown in the figures, the center plate 4 is an annular body, and a bearing surface 41 is formed in an upper surface 40 of the center plate 4, in order to support a load applied via the load transmission surface 27 of the annular recessed portion 25 of the upper case 2 and via the sliding sheet 5. The center plate 4 is formed in a wave shape waving vertically in cross-section in the direction of the axis O so that the bearing surface 41 has an annular recessed portion 43 between at least two annular projected portions 42a and 42b. Further, the annular recessed portion 43 of the bearing surface 41 is filled with lubricant such as lubricating grease.

The sliding sheet 5 is formed of thermoplastic superior in sliding characteristics, such as fluorine resin such as PTFE, polyacetal resin, polyethylene resin, polyamide resin, polyphenylene sulfide resin, or the like. The sliding sheet 5 is added with lubricant such as PTFE (except for the case where the thermoplastic is PTFE resin), lubricating oil, silicone, or graphite, and/or reinforcing material such as aramid fiber, glass fiber, or carbon fiber as needed. Further, the sliding sheet 5 is placed in the annular space 7 between the bearing surface 41 of the center plate 4 and the load transmission surface 27 of the upper case 2.

Figure 6:
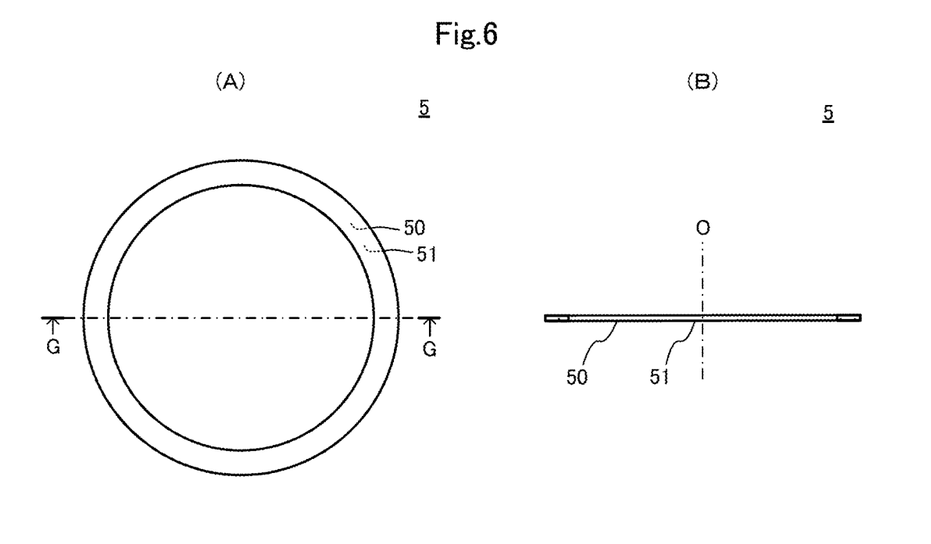
FIG. 6(A) is a plan view of a sliding sheet 5.
FIG. 6(B) is a G-G cross-section view of the sliding sheet 5 shown in FIG. 6(A)

FIG. 6(A) is a plan view of the sliding sheet 5, and FIG. 6(B) is a G-G cross-section view of the sliding sheet 5 shown in FIG. 6(A).

As shown in the figures, the sliding sheet 5 is an annular body formed in a flat plate shape in cross-section in the direction of the axis O, and a sliding surface 51 which comes in sliding contact with the bearing surface 41 of the center plate 4, is formed in a lower surface 50 of the sliding sheet 5. When the sliding surface 51 of the sliding sheet 5 comes in sliding contact with the bearing surface 41 of the center plate 4, the upper case 2 and the lower case 3 can rotate freely with respect to each other.

The dust seal 6 is formed of elastic body such as urethane resin. As shown in FIG. 2, the dust seal 6 is fitted on the flange portion 32 of the lower case body 31 of the lower case 3, and closes a gap leading to the annular space 7 between the upper case 2 and the lower case 3.

Figure 7:
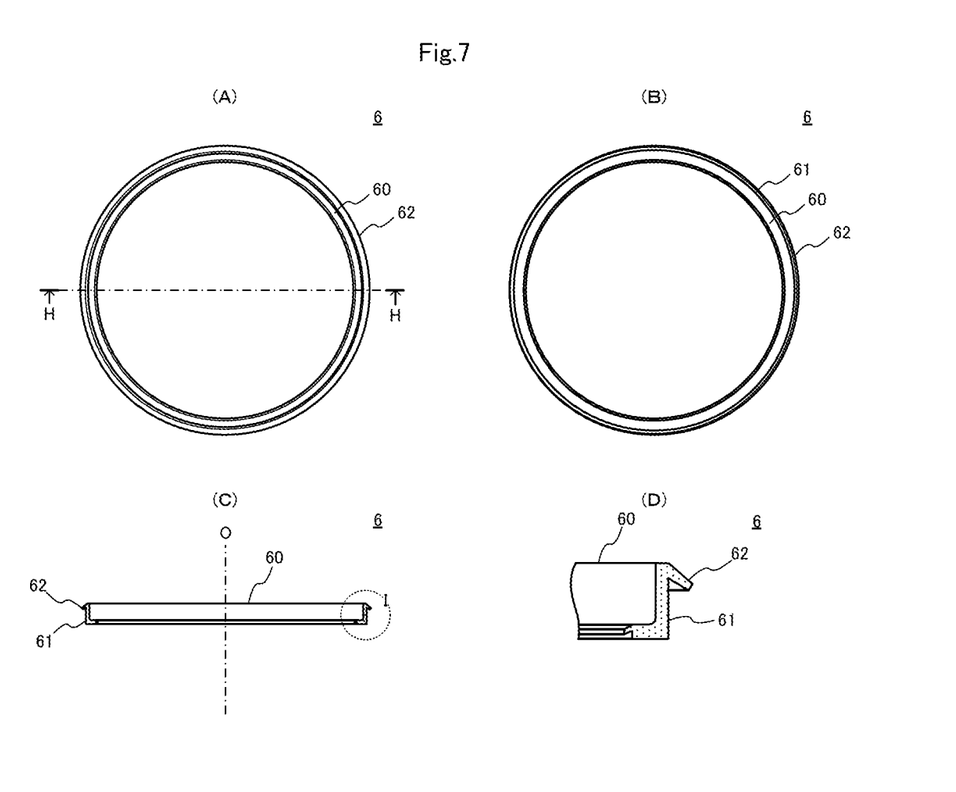
FIGS. 7(A) and 7(B) are respectively a plan view and a bottom view of a dust seal 6.
FIG. 7(C) is an H-H cross-section view of the dust seal 6 shown in FIG. 7(A)
FIG. 7(D) is an enlarged view of the part I of the dust seal 6 shown in FIG. 7(C)

FIGS. 7(A) and 7(B) are respectively a plan view and a bottom view of the dust seal 6, FIG. 7(C) is an H-H cross-section view of the dust seal 6 shown in FIG. 7(A), and FIG. 7(D) is an enlarged view of the part I of the dust seal 6 shown in FIG. 7(C).

As shown in the figures, the dust seal 6 comprises: a tubular dust seal body 60 which is fitted on the flange portion 32 of the lower case body 31 of the lower case 3; and an annular lip portion 62 which extends radially outward from an outer peripheral surface 61 of the dust seal body 60. The lip portion 62 is abutted against an outer-periphery-side inner wall 28 of the annular recessed portion 25 of the upper case 2, in a state that the dust seal body 60 is fitted on the flange portion 32 of the lower case body 31 of the lower case 3. Owing to this arrangement, the dust seal 6 closes the gap leading to the annular space 7 between the upper case 2 and the lower case 3, and prevents intrusion of dust into the annular space 7 (See FIG. 2).

In the slide bearing 1 of the present embodiment having the above-described configuration, the center plate 4 is placed in the annular recessed portion 34 of the lower case 3 which forms the annular space 7 in combination with the annular recessed portion 25 of the upper case 2. In the upper surface 40 of the center plate 4, the center plate 4 has the bearing surface 41 for supporting a load applied via the load transmission surface 27 of the annular recessed portion 25 of the upper case 2 and via the sliding sheet 5. Further, the sliding sheet 5 is placed in the annular space 7 between the bearing surface 41 of the center plate 4 and the load transmission surface 27 of the upper case 2. In the lower surface 50 of the sliding sheet 5, the sliding sheet 5 has the sliding surface 51 that is in sliding contact with the bearing surface 41 of the center plate 4. Because of the center plate 4 and the sliding sheet 5 between the upper case 2 and the lower case 3, the upper case 2 and the lower case 3 are combined rotatably in relation to each other. Accordingly, the slide bearing 1 can support the vehicle body's load applied to the strut-type suspension while allowing rotation of the strut assembly of the strut-type suspension which is inserted in the receiving hole 10.

Further, in the slide bearing 1 of the present embodiment, concerning the center plate 4 and the sliding sheet 5 placed in the annular space 7 that is formed by combining the upper case 2 and the lower case 3, the sliding sheet 5 is formed of thermoplastic having superior sliding characteristics, and the center plate 4 is formed of thermoplastic elastomer having a lower elastic modulus (lower rigidity) than that of the thermoplastic of the sliding sheet 5. Owing to elastic deformation of the center plate 4 formed of the thermoplastic elastomer, the sliding surface 51 of the sliding sheet 5 is in gapless contact with the two annular projected portions 42a and 42b provided in the bearing surface 41 of the center plate 4. Thereby, the sealing performance of the lubricant filled in the annular recessed portion 43 of the bearing surface 41 of the center plate 4 is improved. Accordingly, even if an unbalanced load is applied to the sliding sheet 5 and the center plate 4 via the load transmission surface 27 of the upper case 2, the lubricant lubricating the sliding surface 51 of the sliding sheet 5 and the bearing surface 41 of the center plate 4 can be prevented from being pushed out from a gap between the sliding surface 51 of the sliding sheet 5 and the bearing surface 41 of the center plate 4. Accordingly, the lubricant can lubricate the sliding surface 51 of the sliding sheet 5 and the bearing surface 41 of the center plate 4 over a long period, and thus vehicle body's load applied to the strut-type suspension can be supported over a long period while allowing smooth rotation of the strut assembly of the strut-type suspension.

Further, in the slide bearing 1 of the present embodiment, the center plate 4 is formed in the wave shape in cross-section in the direction of the axis O. Accordingly, the center plate 4 can be elastically deformed more largely and more easily in comparison with the case where the center plate 4 is formed in a flat plate shape in cross-section in the direction of the axis O. By this, the sealing performance of the lubricant filled in the annular recessed portion 43 of the bearing surface 41 of the center plate 4 is further improved, and the lubricant can lubricate the sliding surface 51 of the sliding sheet 5 and the bearing surface 41 of the center plate 4 over a longer period.

The present invention is not limited to the above-described embodiment, and can be varied variously within the scope of the invention.

For example, in the above embodiment, the sliding sheet 5 is formed of thermoplastic, and the center plate 4 is formed of thermoplastic elastomer. However, the present invention is not limited to this. The center plate 4 may be formed of thermoplastic, and the sliding sheet 5 may be formed of thermoplastic elastomer. In that case, the bumps of the bearing surface 41 of the center plate 4 formed of thermoplastic may be transferred to the sliding surface 51 of the sliding sheet 5 formed of thermoplastic elastomer. And, depending on shapes of the bumps transferred to the sliding surface 51 of the sliding sheet 5, there is a possibility that the bumps produces steps in the direction of the sliding contact (rotational direction) between the sliding surface 51 of the sliding sheet 5 and the bearing surface 41 of the center plate 4. The steps thus produced prevent smooth rotation between both surfaces 51 and 41. However, because the bumps of the bearing surface 41 of the center plate 4 are formed in annular shapes (the annular projected portions 42a, 42b and the annular recessed portion 43), no step is produced in the direction of the sliding contact between the sliding surface 51 of the sliding sheet 5 and the bearing surface 41 of the center plate 4. Thus, it is possible to prevent the bumps transferred to the sliding surface 51 of the sliding sheet 5 from interfering with smooth rotation between the sliding surface 51 of the sliding sheet 5 and the bearing surface 41 of the center plate 4.

Figure 8:
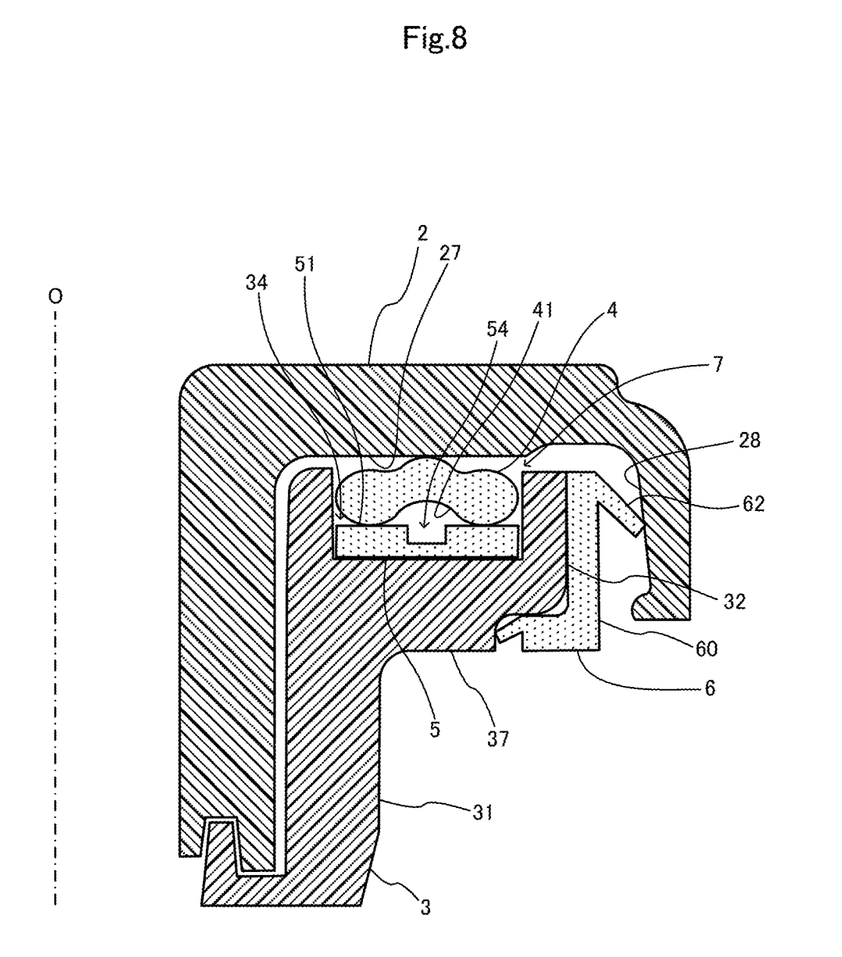
FIG. 8 is a view corresponding to FIG. 2 (enlarged view of the part B of FIG. 1(D)) and shows a variation of the slide bearing 1 according to the one embodiment of the present invention.
Figure 9:
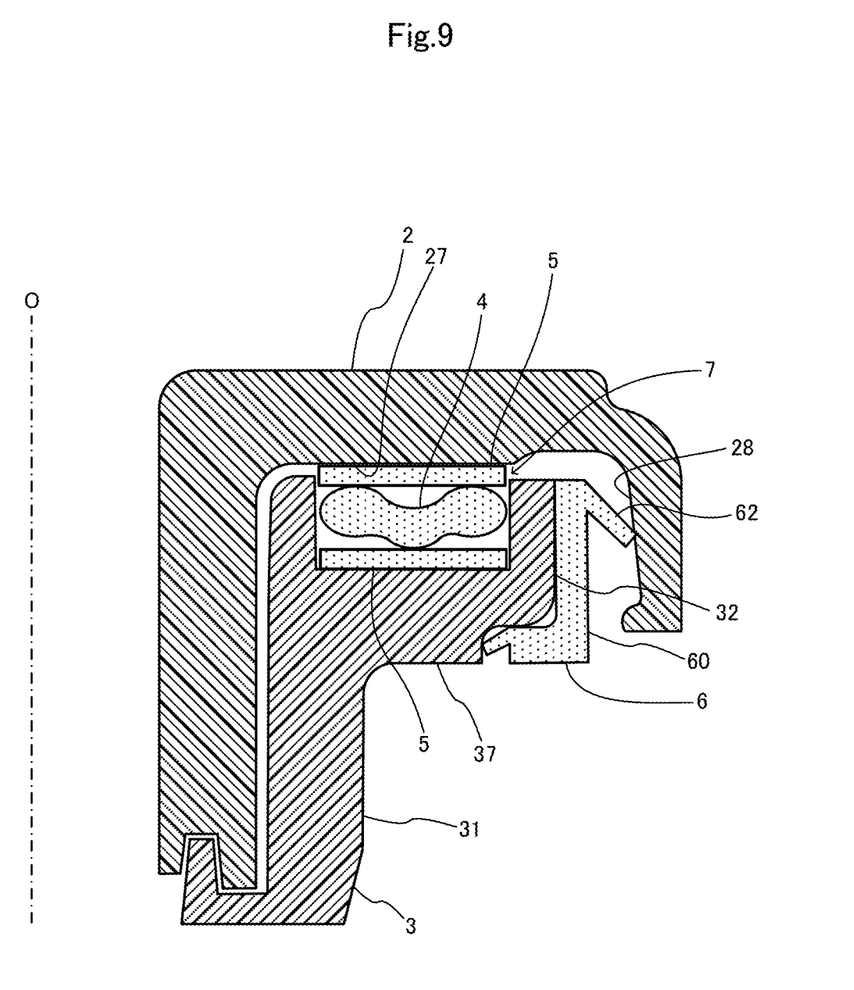
FIG. 9 is a view corresponding to FIG. 2 (enlarged view of the part B of FIG. 1(D)) and shows a variation of the slide bearing 1 according to the one embodiment of the present invention.

Further, as shown in FIG. 2, in the above embodiment, the center plate 4 is placed in the annular space 7 on the side of the lower case 3 with the bearing surface 41 facing upward, and the sliding sheet 5 is placed in the annular space 7 on the side of the upper case 2 with the sliding surface 51 facing downward. The present invention, however, is not limited to this. As shown in FIG. 8, it is possible that the center plate 4 is placed in the annular space 7 on the side of the upper case 2 with the bearing surface 41 facing downward, and the sliding sheet 5 is placed in the annular space 7 on the side of the lower case 3 with the sliding surface 51 facing upward. In that case, the sliding surface 51 may be provided with a grease reservoir (annular recessed portion) 54 for holding lubricant between the bearing surface 41 of the center plate 4 and the sliding surface 51 of the sliding sheet 5. Further, as shown in FIG. 9, sliding sheets 5 may be placed over and under the center plate 4, so that the center plate 4 is vertically put between a pair of sliding sheets 5.

Further, as shown in FIG. 2, in the above embodiment, the center plate 4 is formed in a wave shape waving vertically in cross-section in the direction of the axis O. The present invention is not limited to this. Any shape may be chosen as far as it is an easily elastically deformable shape. For example, as the center plate 4a shown in FIG. 10(A), the lower surface 44 may be a flat surface. Or, as the center plate 4b shown in FIG. 10(B), bearing surfaces 41 may be formed on both sides, i.e. in the upper surface 40 and the lower surface 44 of the center plate 4 so that the bearing surfaces 41 each have an annular recessed portion 43 positioned between at least two annular projected portions 42a and 42b.

Figure 10:
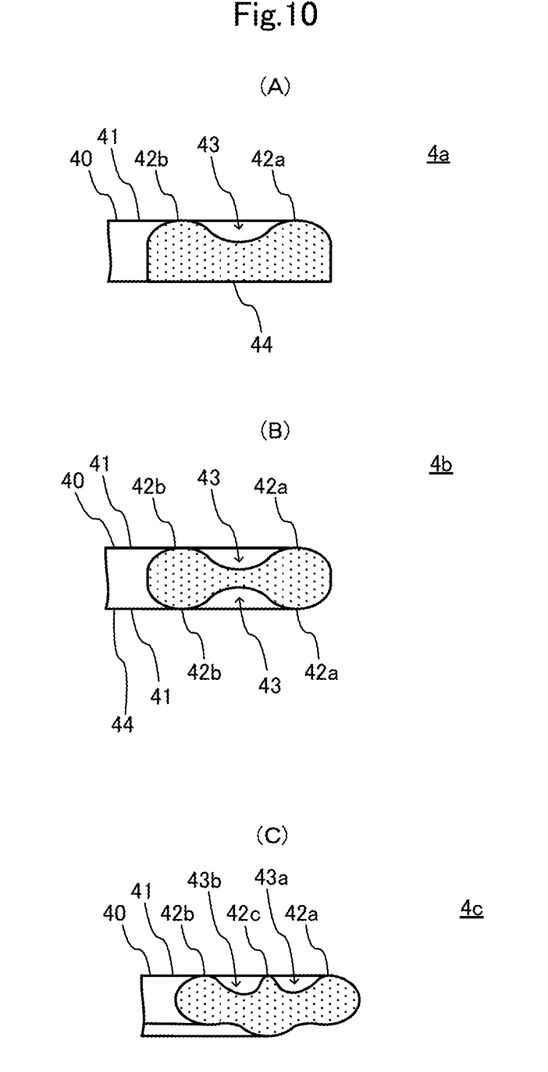
FIGS. 10(A)-10(C) are views each corresponding to FIG. 5(C) (enlarged view of the part F of FIG. 5(B)) and show variations 4a-4c of the center plate 4.

Or, as the center plate 4c shown in FIG. 10(C), two or more annular recessed portions 43a, 43b may be formed in the bearing surface 41 by providing three or more annular projected portions 42a-42c. Here, in the figure, the annular recessed portion 43a is formed between the annular projected portion 42a and the annular projected portion 42c, and the annular projected recessed portion 43b is formed between the annular projected portion 42c and the annular projected portion 42b.

The present invention can be widely applied to slide bearings for supporting a load applied to a shaft member while allowing rotation of the shaft member in various mechanisms including a strut-type suspension.

REFERENCE SIGNS LIST

1: slide bearing; 2: upper case; 3: lower case; 4, 4a: center plate; 5, 5a: sliding sheet; 6: dust seal; 7: annular space; 10: receiving hole of the slide bearing 1; 20: insertion hole of the upper case 2; 21: upper case body; 22: upper surface of the upper case body 21; 23: attaching surface of the upper case body 21; 24: lower surface of the upper case body 21; 25: annular recessed portion of the upper case body; 26: bottom surface of the annular recessed portion 25; 27: load transmission surface of the upper case 2; 28: outer-periphery-side inner wall of the annular recessed portion 25; 30: insertion hole of the lower case 3; 31: lower case body; 32: flange portion of the lower case body 31; 33: upper surface of the flange portion 32; 34: annular recessed portion of the lower case body 31; 35: upper end portion of the lower case body 31; 36: outer peripheral surface of the lower case body 31; 37: lower surface of the flange portion 32; 40: upper surface of the center plate 4; 41: bearing surface of the center plate 4; 42a, 42b: annular projected portion of the bearing surface 41; 43: annular recessed portion of the bearing surface 41; 44: lower surface of the center plate 4; 50: lower surface of the sliding sheet 5; 51: sliding surface of the sliding sheet 5; 54: grease reservoir; 60: dust seal body of the dust seal 6; 61: outer peripheral surface of the dust seal body 60; and 62: lip portion of the dust seal 6.

The invention claimed is:

1. A slide bearing for supporting a load applied to a shaft member while allowing rotation of the shaft member, comprising:
    an upper case which is attached to an object to be supported by the shaft member in a state that the shaft member is inserted in the upper case;
    a lower case which is rotatably combined with the upper case in a state that the shaft member is inserted in the lower case, so that an annular space is formed between the upper case and the lower case; and
    an annular center plate and an annular sliding sheet which are placed in the annular space;
    wherein, the sliding sheet is placed at least either between the upper case and the center plate or between the center plate and the lower case;
    at least one of a surface of the center plate and a surface of the sliding sheet which are in sliding contact with each other, has a recessed portion to be filled with a lubricant; and
    one of the center plate and the sliding sheet is formed of elastically-deformable material having a lower elastic modulus than the other.

2. The slide bearing of claim 1, wherein:
one of the center plate and the sliding sheet is formed of a thermoplastic and the other is formed of a thermoplastic elastomer having a lower elastic modulus than the thermoplastic.

3. The slide bearing of claim 2, wherein:
the center plate has a wave shape in cross-section in the direction of its axis.

4. The slide bearing of claim 3, wherein:
the recessed portion to be filled with the lubricant is formed in an annular shape in at least one of the surface of the center plate and the surface of the sliding sheet which are in sliding contact with each other.

5. The slide bearing of claim 4, further comprising:
a seal member which is placed between the upper case and the lower case and shuts the annular space from outside.

6. The slide bearing of claim 3, further comprising:
a seal member which is placed between the upper case and the lower case and shuts the annular space from outside.

7. The slide bearing of claim 1, wherein:
the center plate has a wave shape in cross-section in the direction of its axis.

8. The slide bearing of claim 7, wherein:
the recessed portion to be filled with the lubricant is formed in an annular shape in at least one of the surface of the center plate and the surface of the sliding sheet which are in sliding contact with each other.

9. The slide bearing of claim 8, further comprising:
a seal member which is placed between the upper case and the lower case and shuts the annular space from outside.

10. The slide bearing of claim 7, further comprising:
a seal member which is placed between the upper case and the lower case and shuts the annular space from outside.

11. The slide bearing of claim 1, wherein:
the recessed portion to be filled with the lubricant is formed in an annular shape in at least one of the surface of the center plate and the surface of the sliding sheet which are in sliding contact with each other.

12. The slide bearing of claim 11, further comprising:
a seal member which is placed between the upper case and the lower case and shuts the annular space from outside.

13. The slide bearing of claim 2, wherein:
the recessed portion to be filled with the lubricant is formed in an annular shape in at least one of the surface of the center plate and the surface of the sliding sheet which are in sliding contact with each other.

14. The slide bearing of claim 13, further comprising:
a seal member which is placed between the upper case and the lower case and shuts the annular space from outside.

15. The slide bearing of claim 2, further comprising:
a seal member which is placed between the upper case and the lower case and shuts the annular space from outside.

16. The slide bearing of claim 1, further comprising:
a seal member which is placed between the upper case and the lower case and shuts the annular space from outside.

* * * * *